United States Patent [19]

Sato

[11] Patent Number: 4,600,864
[45] Date of Patent: Jul. 15, 1986

[54] EASILY RESTARTED BRUSHLESS DC MOTOR

[75] Inventor: Hironobu Sato, Ohta, Japan

[73] Assignees: Sanyo Electric Co., Ltd., Osaka; Tokyo Sanyo Electric Co., Ltd., Gunma, both of Japan

[21] Appl. No.: 694,166

[22] Filed: Jan. 23, 1985

[30] Foreign Application Priority Data

| Feb. 1, 1984 [JP] | Japan | 59-17384 |
| Feb. 28, 1984 [JP] | Japan | 59-38249 |
| Jul. 4, 1984 [JP] | Japan | 59-138760 |

[51] Int. Cl.$^4$ ............................................. H02K 29/08
[52] U.S. Cl. .................................. 318/254; 310/68 R; 310/156; 310/216
[58] Field of Search ................... 318/138, 254 A, 254, 318/439; 310/68 R, 156, 216

[56] References Cited

U.S. PATENT DOCUMENTS

| 2,704,334 | 3/1955 | Brailsford | 318/254 X |
| 2,717,350 | 9/1955 | Brailsford | 318/254 |
| 2,719,944 | 10/1955 | Brailsford | 318/254 |
| 2,968,755 | 1/1961 | Baermann | 318/254 |
| 3,146,388 | 8/1964 | Rasor | 318/254 X |
| 3,402,337 | 9/1968 | Malmborg et al. | 318/254 |
| 3,622,851 | 11/1971 | Hanada | 318/254 X |
| 4,030,005 | 6/1977 | Doemen | 318/138 |
| 4,041,336 | 8/1977 | Sudler et al. | 310/156 X |
| 4,482,832 | 11/1984 | Minton | 310/216 |

FOREIGN PATENT DOCUMENTS

| 54-126917 | 10/1979 | Japan | 310/68 R |
| 55-29246 | 3/1980 | Japan | . |
| 55-166473 | 12/1980 | Japan | 318/254 |
| 56-53568 | 5/1981 | Japan | 310/156 |
| 57-8368 | 2/1982 | Japan | . |
| 57-16575 | 4/1982 | Japan | . |
| 57-83149 | 5/1982 | Japan | . |

Primary Examiner—Bernard Roskoski
Assistant Examiner—Bentsu Ro
Attorney, Agent, or Firm—Wenderoth, Lind & Ponack

[57] ABSTRACT

An easily restarted brushless DC motor has a skeleton type stator core, a rotor core having permanent magnets arranged around it, and needs only one position sensor adapted to detect a rotational position of a rotor and only one stator coil. A controller is provided for switching over the polarity of the electrical power supplied to the stator coil in accordance with an output of the position sensor.

6 Claims, 9 Drawing Figures

EASILY RESTARTED BRUSHLESS DC MOTOR

BACKGROUND OF THE INVENTION

The present invention relates in general to brushless motor and, more particularly, to a small brushless motor having a skeleton type stator core.

In general, small motors of the skeleton type having a stator core and a stator coil, such as, for example the shaded-pole motor as disclosed in Japanese Patent Publication No. 57-16575 published Apr. 16, 1982, are small and simply constructed, and have been used usually because of their moderate price owing to the ease of manufacture. The shaded-pole motor has, in addition to the stator coil, shading coils wound on the stator core for producing a rotational magnetic field. In this motor, since a large part of the stator electric current flows through the shading coils, the efficiency of the motor is decreased correspondingly. In other words, the use of shading coils hinders the efficient operation of the motor. Usually, motors are driven by, A.C. electrical power supply, typically by commercial A.C. power. The rated speed of the motor, therefore, is determined by the frequency of the commercial power. In order to obtain different rated speeds, therefore, it has been necessary to employ a complicated control circuit or to design motors for different rated speeds.

It is to be also noted that the configuration of the air gap between the stator and the rotor, defined by the configuration of the cross-section of a rotor bore in the core, is uniform in the skeleton-type, small motor disclosed in Japanese utility Model Publication No. 57-8368 published Feb. 17, 1982.

Therefore, the rotational position at which the rotor is stopped after the power supply is turned off is not constant due to various factors such as the inertia of the load connected to the motor, friction of the bearing, and so forth. This does not cause any substantial problem in the shaded-pole type motor. However, in a brushless motor having a rotor constituted by a permanent magnet, the rotor stopping position induces a certain problem in regard to the re-starting of the motor. More specifically, in this type of motor, it is necessary to switch over the polarity of the power supply in accordance with the rotational position of the rotor when the motor is to be re-started. Therefore, a Hall generator has been used for detecting the position of the rotor. Furthermore, when the rotor and the stator have two poles, respectively, it is difficult to re-start the motor when the rotor is stopped at a rotational position where the centers of the magnetic flux through the rotor bore and rotor poles substantially aligned with each other. This problem would be solved by adding Hall generators, stator poles and rotor poles in such a way as to meet a given condition. For instance, it is possible to obviate the above-described problems by using, in combination, a stator having three poles and a rotor having four poles or two poles. This, however, requires a large number of Hall generators, which in turn raises the cost of production of the electric motor through its complication and an increase in the size of the power supply control circuit. Such a complicated control circuit is difficult to maintain and tends to degrade the reliability of the motor.

In order to solve these problems, various measures have been proposed to make the rotor stop at a constant rotational position. One of these known measures is to provide a non-uniform air gap between the rotor and the stator by, for example, increasing the air gap at a portion of the circumference around the rotor. Unfortunately, however, this countermeasure cannot perfectly ensure the stopping of the rotor at a constant position due to the inertia of the rotor.

Japanese Patent Application No. 55-151204 (published May 24, 1982 under No. 57-83149) discloses an electric motor in which the bore of the cylindrical stator core is made to have an irregular form so as to provide a non-uniform air gap, thereby ensuring the stopping of the rotor at a constant rotational position. In this case, however, it is necessary to wind the stator coil directly on the stator core at a uniform thickness and to position this coil precisely such that the stator coil produces a magnetomotive force at an angle of 90° to the direction of the magnetic field produced by the rotor. In addition, the mean air gap is increased by an amount corresponding to the thickness of the stator coil. The increased air gap correspondingly increases the leakage of magnetic flux and reduces the working efficiency of the motor. To avoid this problem, it is necessary to employ a permanent magnet which has a high magnetic flux density and which is strongly resistant to irreversible demagnetization. This magnet, however, increases the cost of the motor. Furthermore, since the minimum air gap is limited due to the thickness of the stator coil, the stopping torque for limiting the rotation of the rotor towards the constant stopping position is rather small. This in turn limits the torque of the load which is to be driven by the motor.

On the other hand, Japanese Patent Application No. 53-101072 (published Mar. 1, 1980 under No. 55-29246) discloses single phase brushless motor which comprises: a field system having a field coil; a rotor constituted by a permanent magnet rotatably disposed in the field; magnetic wires disposed under the influence of the N and S poles of the rotor and constituted by a core and a shell having different levels of coercive forces, the magnetic wires being magnetized in the axial direction; a coil adapted to produce a voltage in response to a change in the magnetic field of the magnetic wires; and an electric circuit for controlling the power supply to the field coil in response to the voltage signal generated in the coil.

In the conventional brushless motor mentioned above, the magnetic wires arranged in a pair are used as a sensor for detecting the rotational position of the rotor. Unfortunately, however, it is difficult to mount these sensors. In some cases, the timing of switching over the power supply to the stator coil varies so as to cause various problems such as unstable rotation of the rotor and a reduction in the efficiency of the motor. In addition, the use of a plurality of position sensors makes it difficult to reduce the size and cost of the motor.

Furthermore, in the known small motors mentioned hereinbefore, the stator core has to be exactly cylindrical and, in addition, the stator coil has to be divided into two sections, and therefore the overall structure of the motor becomes complex.

SUMMARY OF THE INVENTION

In view of the above, it is an object of the invention to provide a brushless D.C. motor of the skeleton type having increased the efficiency.

Another object of the invention is to provide a brushless D.C. motor employing a skeleton type stator core which can be easily re-started regardless of the rotational position at which the rotor has been stopped.

Still another object of the invention is to provide a small motor having a stator core of a reduced size and a means for detecting the rotational position at which the rotor is stopped, wherever the rotor may be stopped.

According to a preferred embodiment of the invention, a motor has a permanent magnet provided on the periphery of the rotor core, a rotational position sensor such as for example, Hall generator for detecting the rotational position of the rotor, and a controller for alternately switching over the polarity of the power supplied to the stator coil in accordance with the output from the rotational position sensor.

In the present invention, the stator core comprises a plurality of electrical steel sheets to form a laminated stator core, a bore for receiving the rotor, and a core for the stator coil on one side of the bore. The stator coil is composed of a single coil having a pair of terminals, and the rotational position sensor is composed of a single magnetic sensor. The polarity of the electric power supplied to the stator coil is alternately switched over by the controller.

In another preferred embodiment of the invention, a rotor-receiving bore formed in the stator core of the motor has a cross-section composed of a plurality of arcs of an equal radius and having centers which are offset from each other, thereby ensuring the stopping of the rotor at a constant rotational position.

According to still another preferred embodiment of the invention, a small motor comprises: a skeleton-type stator core which provides a non-uniform air gap between the stator and the rotor; a stator coil for inverting a rotary magnetic field to the rotor through the stator core; a position sensor for detecting the rotational position of the rotor; and a controller for controlling the polarity of the power supplied to the stator coil in accordance with the output from the position detecting sensor; wherein the pole separating portion of the stator core and the position sensor mounting portion are offset by a predetermined electrical angle about the axis of the rotor shaft.

DETAILED DESCRIPTION OF THE PREFERRED EMBODIMENTS

Embodiment 1

Figure 1A:
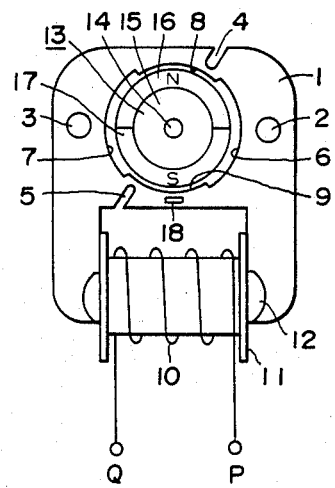
FIG. 1A is a front elevational, explanatory view of an electric motor embodying the invention.
Figure 1B:
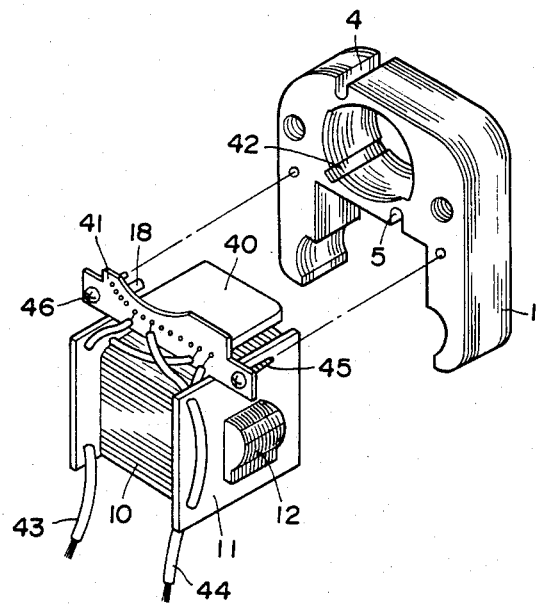
FIG. 1B is a fragmentary, perspective view of the motor with some parts such as a rotor being omitted for simplification only.

In FIGS. 1A and 1B, reference numeral 1 denotes a laminated stator core composed of a plurality of electrical steel sheets punched out in a skeleton shape and superposed in layers. The stator core 1 has bolt holes 2 and 3 for receiving an arm of the rotor shaft bearing (not shown) and pole separating notches 4 and 5. The stator core has a central bore for receiving a rotor 13. The bore has a contour constituted by portions 6 and 7 defining large air gaps between themselves and the rotor 13, and portions 8 and 9 defining smaller air gaps between themselves and the rotor 13. The stator core 1 further has a portion carrying a bobbin 11 having a core 12 on which a stator coil 10 is wound. Symbols P and Q show terminals of the stator coil in respective polarities.

The rotor 13 has a rotor shaft 14, a rotor core 15 and permanent magnets 16 and 17 provided on the periphery of the rotor core 15. A reference numeral 18 designates a Hall generator for detecting the rotational position of the rotor 13. Thus, large air gaps 6 and 7 and small air gaps 8 and 9 are formed alternately between the permanent magnets 16 and 17 of the rotor 13 and the stator core 1. With this arrangement, as is well known to those skilled in the art, the rotor 13 is stopped at a constant rotational position as shown in FIG. 1 or at a position 180° turned from this position, due to the balance of the magnetic attracting forces.

As illustrated in FIG. 1B, winding ends of the stator coil 10 are soldered to a substrate 41, and the rotational position sensor such as the Hall generator 18 is fixed to the substrate 41 so that the Hall generator 18 is snugly fitted to a groove 42 formed on the central bore wall of the stator core 1. Reference numeral 40 represents a controller, preferred circuits of which will be explained presently with reference to FIGS. 2 and 6, which is molded with suitable resins and the like and soldered to the substrate 41. Reference numerals 43 and 44 are lead wires connected to a pair of terminal of the stator coil 10. Each of the lead wires is connected to the substrate 41 at its one end and to the D.C. power supply shown by reference numeral 25 in FIG. 2, at its other end. The substrate 41 is fixed to the stator core 1 by a suitable fastening means such as screws 45 and 46, so that the controller 40 is fitted in the space between the stator core 1 and the coil 10.

Figure 2:
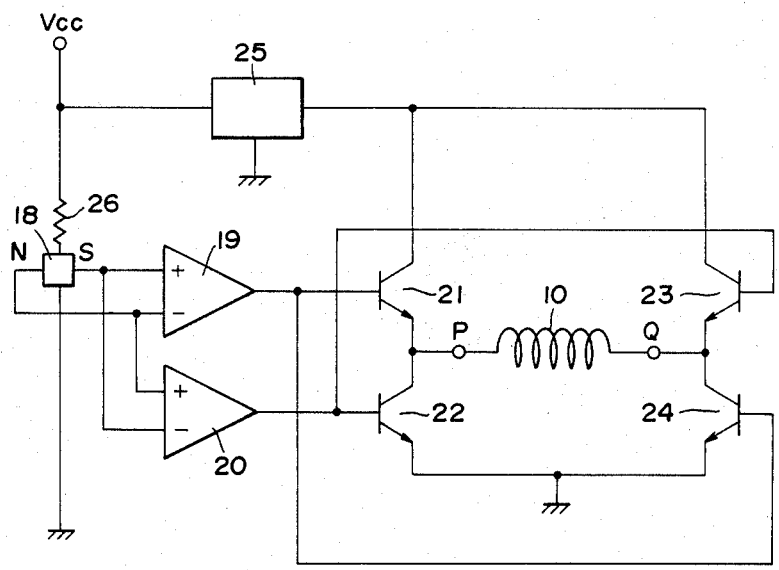
FIG. 2 is an electric circuit diagram of a controller incorporated in the electrical motor as shown in FIG. 1.

FIG. 2 is an electrical circuit diagram of a controller for switching over the polarity of the power supplied to the stator coil 10. In FIG. 2, reference numerals 10 and 18 denote, respectively, the stator coil and the Hall generator as shown in FIGS. 1A and 1B and numerals 19 and 20 are comparators. These comparators 19 and 20 are adapted to deliver their outputs alternately in accordance with the output from the Hall generator 18. Numerals 21 to 24 designate switching transistors connected in the form of a bridge. The outputs of these transistors 21 to 24 are connected to the terminals P and Q of the stator coil 10. Transistors 21 to 24 are adapted to be supplied with D.C. power from a D.C. power supply 25, the output voltage of which is variable as desired. The speed of the motor can be changed by varying the output voltage of the power supply 25 as in the case of an ordinary D.C. brushless motor. A numeral 26 designates a resistor serving as a protector for the Hall generator 18.

Figure 3:
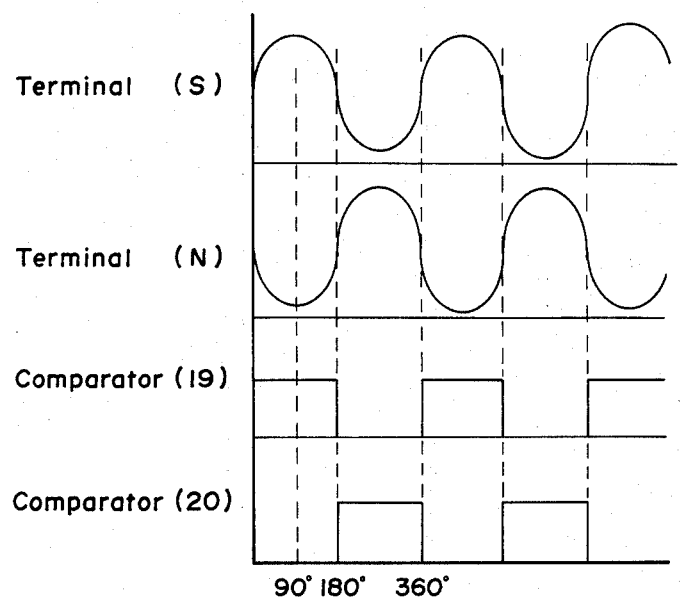
FIG. 3 is a diagram showing the waveform of a signal appearing on the terminal of a Hall generator and the waveform of the output from a comparator.

For operating the small motor having the described construction, D.C. power is supplied to the terminal Vcc shown in FIG. 2, so that outputs as shown in FIG. 3 are derived from the terminals N and S of the Hall generator 18. In consequence, the transistors 21 and 24 are turned on by the output from the comparator 19. The transistors 22 and 23 are in the OFF state because no output is derived from the comparator 20. Consequently, an electric current flows from the terminal P of the stator coil 10 to the terminal Q so that N and S poles are formed around the large gaps 6 and 7. Consequently, the rotor 13 (FIG. 1A) starts to rotate clockwise due to the attraction and repulsion by the permanent magnets 16 and 17. As a result of the rotation of the rotor 13, the outputs at the terminals S and N of the Hall generator are changed as shown in FIG. 3. The outputs of the comparators 19 and 20 are switched over when the rotor 13 has been rotated 90° as shown in FIG. 3. This in turn causes an electric current to flow from the terminal Q to the terminal P of the stator coil 10 so that S and N poles are formed around the large air gaps 6 and 7, respectively. Consequently, the rotor 13 continues to rotate clockwise due to the inertia and the newly produced attraction and repulsion produced by the permanent magnets 16 and 17. Thus, the polarities of the magnetic poles formed around the large air gaps 6 and 7 in the stator core 1 are switched over for each of successive 180° rotations of the rotor 13, so that the clockwise rotation of the rotor 13 is continuously maintained by the attraction and repulsion effected by the permanent magnets 16 and 17 alternately.

As has been described, the first embodiment of the small motor has permanent magnets provided around the rotor core, a Hall generator for detecting the rotational position of the rotor, and a controller for switching over the polarity of the power supplied to the stator coil in accordance with the output from the Hall generator. It is, therefore, possible to drive the motor by D.C. power so that the shading coil used in the conventional motor can be dispensed with. This, in turn, increases the efficiency of the motor and reduces the size of the motor. Also, since the motor can be driven by D.C. power, it is possible to change the speed of the motor by changing the voltage applied to the motor.

Embodiment 2

Figure 4:
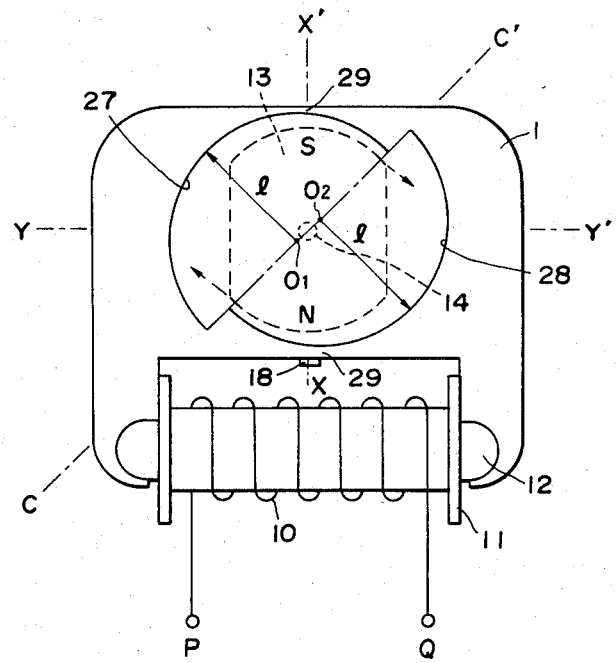
FIG. 4 is a schematic front view of a skeleton-type core in a further embodiment of the invention.

FIG. 4 shows a second embodiment of the present invention, in which a stator core 1 has a bore having a configuration composed of arcs 27 and 28 having an equal radius 1 and centers $O_1$ and $O_2$ which are offset from each other. In addition, the stator core 1 has a skeleton type structures with a bridging portion 29. In FIG. 4, symbols C-C' show a line on which the points of non-linear change of the air gap exist. These points are located on the right pole beyond the bridge portion 29. Symbols X-X' show the neutral line of the rotor 13 and the stator. When the stator coil 10 is not energized, the rotor 13 is stopped on this line due to the balance with the attracting forces produced by the change in the air gap. In this embodiment, since no stator coil is disposed within the air gap, the minimum air gap can be reduced in size so that the resetting force for limiting the rotation of the rotor towards the stopping position is increased. Symbols Y-Y' represent the center of the magnetic field which is produced when the stator coil 10 is supplied with power. Namely, the magnetic flux produced by the power supplied to the stator coil 10 is saturated in the bridge portion 29 so that the magnetic poles are separated across the bridge portion 29. The rotor 13 is constituted by a permanent magnet having S and N poles and adapted to rotate about the axis of the rotor shaft 14. A reference numeral 18 designates a Hall generator. In accordance with an output of the Hall generator, the polarity of the power supplied to the stator coil 10 is changed-over.

In the D.C. brushless motor explained hereinbefore, when the stator coil 10 is supplied with no power, the rotor 13 is stopped at a constant rotational position shown in FIG. 4 or at a position 180° turned from the position shown in FIG. 4. For example, when the rotor 13 is stopped at the position shown in FIG. 4, the portion of the stator core on the same side of the bridge portion 29 as Y' constitutes an N pole, while the portion on the same side as Y constitutes an S pole, if the power is supplied such that the electric current flows from the terminal P to the terminal Q. In this state, the angle formed between the direction Y-Y' of the magnetomotive force in the stator coil 10 and the direction X-X' of the magnetic field of the rotor 13 is substantially 90°, so that a large starting torque is produced to cause the rotor 13 to rotate clockwise. After 180° rotation of the rotor 13, the polarity of the rotor 13 detected by the Hall generator 18 is inverted so that the polarity of the power supply to the stator coil 10 is switched over such that the electric current flows from the terminal Q to the terminal P. In consequence, the portions of the stator core 1 on the same side as Y' constitutes the S pole, while the portion on the same side as Y constitutes the N pole, and accordingly, the rotor 13 maintains its clockwise rotation. Thereafter, the polarity of the power supplied to the stator coil 10 is switched over in accordance with the rotational position of the rotor so that the rotation of the rotor 13 is maintained by the combination of the magnetic attracting and repulsion forces and the inertia of the rotor 13.

The control circuit for switching over the polarity of the power supplied to the stator coil 10 in accordance with the output from the Hall generator 18 is well known so that no detailed description thereof will be made.

As has been described, in the embodiment of FIG. 4, the D.C. brushless motor has a skeleton type stator core with a stator coil, the stator core having a bore, the cross sectional shape of which is composed of semicircular arcs of an equal radius and with centers offset from each other. Consequently, the rotor can be stopped at any rotational position so that the rotor can be re-started without fail. Furthermore, a punching die for producing the stator core can be made easily and the precision of the die can be enhanced because the punching dice can be formed by a combination of arcs of equal radius. That is, the efficiency of the operation is enhanced through suppression of leakage of the magnetic flux. Since the magnetic flux is substantially saturated in the bridge portion, the position of the rotor can be detected even if the position of the Hall generator is disposed around any other stator portion. This means that nothing is disposed between the rotor and the stator so that the precision of the air gap is enhanced to a smooth and stable re-start and operation of the motor.

Embodiment 3

Figure 5:
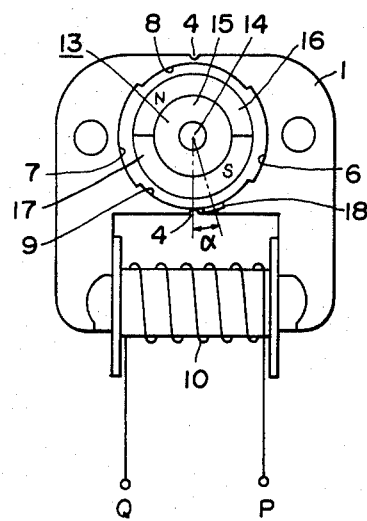
FIG. 5 is a front elevational view of the motor according to another embodiment of the invention.

FIG. 5 shows another embodiment which comprises, as in the cases of the preceding embodiments, a rotor 13 composed of a rotor shaft 14, rotor core 15, and plurality of permanent magnets 16 and 17; a skeleton-type stator core 1 which forms a non-uniform air gap between stator and the rotor 13; a stator coil 10 for applying a rotational magnetic field to the rotor 13 through the stator core 1, and a Hall generator 18 for detecting the position of the rotor 13. This embodiment is distinguished from the preceding embodiments by the mounting positions of the Hall generator 18 and the pole-separation notch 4 in the shape of a recess with a bottom. The Hall generator 18 and the pole separating notch 4 are offset from each other by a predetermined electrical angle $\alpha$ around the rotor shaft 14.

As in the case of the embodiment shown in FIG. 1, numerals 6 and 7 denote portions defining large air gaps which are separated from each other by adjacent portions 8 and 9 defining the small air gaps. Therefore, when the stator coil 10 is not supplied with electric power, the rotor 13 stops at a position where the magnetic attracting force produced by the permanent magnets 16 and 17 is balanced with each other.

Figure 6:
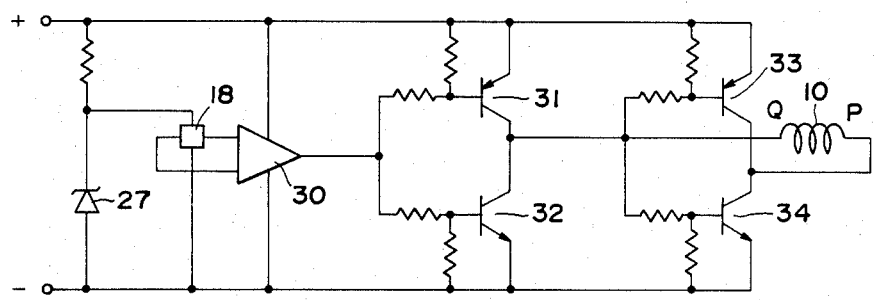
FIG. 6 is a circuit diagram of a controller suitable for electric motors as shown in FIG. 5.
Figure 7:
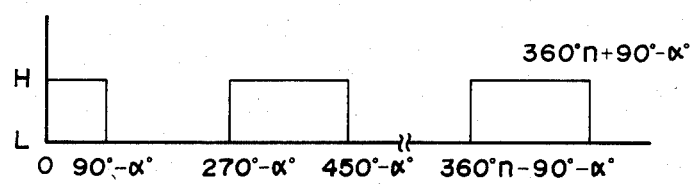
FIG. 7 is an illustration of the output from a comparator shown in FIG. 6.

FIG. 6 is a electric circuit diagram of the electric circuit as used in the electric motor shown in FIG. 5. In FIG. 6 of the drawing, numerals 31 and 33 denote PNP transistors, while numerals 32 and 34 denote NPN transistors. These transistors are connected in the form of a bridge. The output of this bridge circuit is derived from the points of connection between the transistors 33, 34 and between the transistors 31 and 32. Reference numeral 30 denotes a comparator which is adapted to produce a voltage of high or low (H or L) level in accordance with the output from the Hall generator 18. This output is switched over in a manner shown in FIG. 7. Assuming that the position at which the rotor 13 (see FIG. 5) is stopped is represented by electrical angle "O" and that the rotor 13 rotates clockwise, the transistors 32 and 33 assume an take the ON state when the output mentioned above assumes an H level as shown in FIG. 7. In this state, the electrical current flows from the terminal P to the terminal Q of the stator coil 10, so that the left portion and the right portion of the stator core 1 as viewed in the drawings constitute S and N poles, respectively. Conversely, when the above-mentioned output assumes an L level, the transistors 31 and 34 assume an take ON state so that electrical current flows from the terminal Q to the terminal P in the stator coil 10. In this state, the left and right portions of the stator core 1 as viewed in the drawings constitute N and S poles, respectively. Referring to FIG. 6, reference numeral 27 represents a Zener diode which imparts a constant voltage to the Hall generator 18.

In the operation of the electric motor having a aforementioned construction, the rotor 13 is stopped at the position (position shown in FIG. 5) where the magnetic attracting forces exerted by the permanent magnets 16 and 17 are balanced by each other. In consequence, the output of the comparator 30 assumes an H level in response to the output from the Hall generator 18. As a result, the transistors 32 and 33 are turned on so that the an electrical current flows from the terminal P to Q of the stator coil 10 to induce magnetic poles on the stator core 1, thus allowing the rotor 13 to rotate clockwise. After clockwise rotation of the rotor 13 by an angle which is about 90°—$\alpha$, the output from the comparator 30 assumes an L level so that the transistors 31 and 34 are turned on to allow an electrical current to flow from the terminal Q to the terminal P of the stator coil 10. Consequently, the polarities of the magnetic poles on the stator core 1 are reversed so that the rotor 13 continues its clockwise rotation due to thus formed new magnetic polarities and the inertia of the rotor 13. Thereafter, the clockwise rotation is maintained by the inversion of the magnetic poles at each 180° rotation and by the rotational inertia of the rotor 13.

Figure 8:
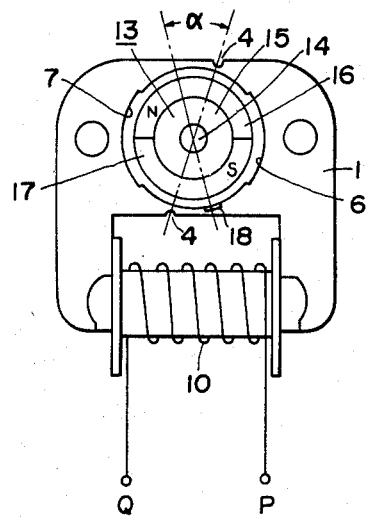
FIG. 8 is a front elevational view of an electric motor as a modification of the embodiment shown in FIG. 5.

FIG. 8 shows another modification in which the pole separation notch 4 is offset from the center and also from the Hall generator 18 by a predetermined electrical angle $\alpha$. Other portions in the FIG. 8 can be considered to be materially identical to those in FIG. 5 and, hence, are not described in detail. In this motor also, the direction of the electrical current in the stator coil 10 is switched over in accordance with the rotational position of the rotor 13, so that the rotor 13 can rotate continuously. When the output of this motor was set at 0.77 (W), the efficiency of operation of the motor was about 19% with an electrical angle $\alpha$ of 65° and was increased to maximum value of about 23% when the angle $\alpha$ was 80°. However, an excessive increase of the electrical angle $\alpha$ up to 90° must be avoided, because such a large electric angle may cause a reversing of the rotor when the motor is re-started. It is, therefore, preferred that the electric angle $\alpha$ formed between the pole separating notch 4 and the position detecting sensor 18 is selected to meet the condition of $0 < \alpha \leq 80°$.

The Hall generator applied in the embodiments of the invention can be replaced, if desired, with other magnetic position sensor such as a magnetic diode, magnetic wire, etc.

Although the present invention has been described with reference to the preferred embodiments, many modifications and alterations can be made within the spirit of the invention.

What is claimed is:

1. A brushless motor comprising a stator core, a rotor having permanent magnets disposed around a rotor core of said rotor, a stator coil providing magnetic flux for exciting said rotor, a rotational position sensor for detecting a rotational position of said rotor, and a controller for controlling polarity of electrical power supplied to said stator coil in accordance with an output from said position sensor, wherein:
   (i) said stator core is made of a plurality of laminated electrical steel sheets, each of said electrical steel sheets having a substantially round aperture and being disposed around said aperture such that a closed magnetic circuit is formed around said aperture and such that a bore for receiving said rotor is formed by said aperture when said plurality of electrical steel sheets are laminated;
   (ii) said stator coil is composed of single coil with a pair of terminals, said stator coil being mounted on one side of said bore of the stator core;
   (iii) said rotational sensor is composed of a single magnetic, non-mechanical sensor which is disposed on said stator core adjacent to an outer surface of said rotor;
   (iv) the polarity of the electrical power of said stator coil is alternately switched over by said controller; and
   (v) said bore of said stator core has a shape such that a continual air gap is formed between a wall of said bore and an outer surface of said rotor, said air gap having portions containing a large gap and portions containing a small gap arranged alternately on a circumferential surface of said bore.

2. A brushless motor according to claim 1, wherein the shape of said bore for receiving said rotor has a configuration composed of semicircular arcs of an equal radius and having centers offset from each other.

3. A brushless motor according to claim 1, wherein the shape of said bore for receiving said rotor is formed in combination by two portions of large gap and two portions of small gap such that the large and small gaps are arranged alternately in the circumferential direction.

4. A brushless motor according to claim 1, wherein said rotational sensor is disposed on a portion of said stator core between said rotor and said stator coil.

5. A brushless motor according to claim 1, wherein said stator core has a pole separating notch, said pole separating notch being offset by a predetermined electrical angle from said position sensor around an axis of said rotor.

6. A brushless electric motor according to claim 5, wherein an electrical angle $\alpha$ formed between said pole separating notch and said position sensor is selected to meet the condition of $0 < \alpha \leq 80°$.

* * * * *